United States Patent
Bryon et al.

(10) Patent No.: US 8,781,286 B2
(45) Date of Patent: Jul. 15, 2014

(54) INSERT FOR AN OPTICAL FIBER ASSEMBLY AND OPTICAL FIBER ASSEMBLY USING AN INSERT

(75) Inventors: Roel Modest Willy Bryon, Aarschot (BE); Kristof Vastmans, Boutersem (BE); Danny Willy August Verheyden, Gelrode (BE); Geert Van Genechten, Wiekevorst (BE); Pascal Breux, St Martin des Champ (FR); Philippe Lesueur, Trebeurden (FR)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 84 days.

(21) Appl. No.: 13/148,648

(22) PCT Filed: Feb. 5, 2010

(86) PCT No.: PCT/EP2010/051413
§ 371 (c)(1),
(2), (4) Date: Aug. 9, 2011

(87) PCT Pub. No.: WO2010/092006
PCT Pub. Date: Aug. 19, 2010

(65) Prior Publication Data
US 2011/0311190 A1   Dec. 22, 2011

(30) Foreign Application Priority Data
Feb. 10, 2009   (EP) ..................................... 09001814

(51) Int. Cl.
G02B 6/44   (2006.01)
G02B 6/00   (2006.01)

(52) U.S. Cl.
CPC ............ *G02B 6/4471* (2013.01); *G02B 6/4429* (2013.01); *G02B 6/4479* (2013.01); *G02B 6/4439* (2013.01); *G02B 6/4405* (2013.01)
USPC ........................................................ 385/136

(58) Field of Classification Search
CPC .......... G02B 6/00; G02B 6/44; G02B 6/4475; G02B 6/4447; G02B 6/4471; G02B 6/4405; G02B 6/4439; G02B 6/4429
USPC ................................. 385/135, 137, 134, 136
See application file for complete search history.

(56) References Cited

U.S. PATENT DOCUMENTS 7,738,761 B2 *   6/2010   Mullaney et al. ............. 385/136
2005/0111799 A1   5/2005   Cooke et al.

FOREIGN PATENT DOCUMENTS

DE   102007035709 A1   2/2009
FR   2917182 A   12/2008

(Continued)

OTHER PUBLICATIONS

International Search Report and Written Opinion issued by the European Patent Office, dated Jul. 28, 2010, for PCT/EP2010/051413; 18 pages.

(Continued)

*Primary Examiner* — Ryan Lepisto
*Assistant Examiner* — Erin Chiem
(74) *Attorney, Agent, or Firm* — Faegre Baker Daniels LLP

(57) ABSTRACT

The present invention relates to an insert for an optical fiber assembly through which an optical fiber element can be pulled out without damage. The insert is provided for guiding a part of the optical cable (2) which comprises at least one optical fiber element (3) and being accommodated in a housing of the optical fiber assembly, wherein said part of the optical cable (2) has a cut-out portion in which a jacket of said optical cable (2) is partially removed, thereby exposing said at least one optical fiber element (3). The insert (1) comprises an optical cable guidance means (4) for guiding said optical cable (2) across the insert (1); a recess (5) surrounding the exposed optical fiber element (3) and a bend element (6) arranged at an end portion of the recess (5) and projecting from the recess (5) in a curved manner.

10 Claims, 3 Drawing Sheets

(56) References Cited

FOREIGN PATENT DOCUMENTS

| | | |
|---|---|---|
| JP | 20000075160 A | 3/2000 |
| JP | 2001116968 A | 4/2001 |
| JP | 2007121773 A | 5/2007 |

OTHER PUBLICATIONS

European Search Report issued by the European Patent Office, dated Sep. 7, 2009, for EP09001814; 9 pages.

* cited by examiner

INSERT FOR AN OPTICAL FIBER ASSEMBLY AND OPTICAL FIBER ASSEMBLY USING AN INSERT

The present invention relates to an insert for guiding a part of an optical cable comprising at least one optical fiber element according to the preamble of claim 1. Such an insert is generally provided in a housing of an optical fiber assembly, wherein said housing is sealed by sealing means against environmental influences. Said insert comprises an optical cable guidance means for guiding the optical cable across the insert and a recess for providing an access to an optical fiber element. For this purpose, the jacket of the optical cable is partially removed, thereby exposing at least one optical fiber element in the cut-out portion of the optical cable.

In general, when a user is connected to an optical cable, a few or even one optical fiber element comprised in the optical cable needs to be spliced, that is the optical fiber element needs to be connected to a further optical fiber element coming from the user side by a method of splicing. Said optical fiber element is surrounded by the jacket of the optical cable. In case of plural optical fiber elements comprised in a single optical cable, each of said optical fiber elements being surrounded by a separate jacket, the same is likewise surrounded by the optical cable jacket. For splicing the optical fiber element, the part of the optical cable which should provide access to the optical fiber element to be spliced has a cut-out portion formed by partially removing the cable jacket, wherein said part of the optical cable is guided and retained by the insert. The optical fiber element exposed in the cut-out portion is accessible through a recess formed in the insert and surrounding the exposed optical fiber element. Further, for the step of splicing said optical fiber element, some length thereof needs to be made available.

On a general basis, the optical fiber element to be spliced is pulled out from the cut-out portion of the optical cable. Said pull out action is generally performed in a speed up manner to ensure a provision of sufficient length in a short time. The jacket of the optical fiber element and the optical fiber element as such can be damaged by e.g. pulling out the optical fiber element around an edge of the cable jacket formed at an intersection of the cut-out portion of the optical cable.

The present invention aims to provide an insert for an optical fiber assembly through which an optical fiber element comprised in an optical cable guided by said insert can be accessed without damage. A further object of the present invention is to provide an optical fiber assembly which uses such an insert.

The above objectives are achieved by an insert as defined in claim 1 and an optical fiber assembly as specified in claim 10. The inventive insert comprises a bend element which protrudes in a running direction of the optical fiber element at an end portion of the recess and which projects into the recess in a curved manner.

With the present invention, an insert is provided, which reliably prevents a damage of the optical fiber element during a pull-out action. While pulling out the optical fiber element from the optical cable, said optical fiber element is guided along the curved portion of the bend element. Thereby, the optical fiber element can be smoothly guided and pulled out from the optical cable through the recess without sliding at sharp edges like an edge formed at the intersection of the cable jacket in the cut-out portion.

The bend element of the inventive insert is projecting the recess in a curved manner. This projection is to be understood at least as a projection in a direction perpendicular to the running direction of the optical fiber element and generally normal to the opening surface provided within the recess. Apart from this projection, the bend element may likewise project the recess in the running direction of the optical fiber element. With such a design, the bend element will protrude usually aligned with and parallel to the optical fiber elements made available in the cut-out portion.

According to a parallel aspect of the present invention, the same provides an optical fiber assembly for an optical cable with a housing comprising a housing lower body and a housing upper body enclosing the inventive insert and furthermore comprising a seal means for sealing the housing. In an optical fiber assembly such seal means are generally formed of a gel pad suitable to hermetically seal the housing at a port through which the at least one optical cable passes into the housing.

Preferred embodiments of the inventive insert are defined in the dependent claims.

The present invention will now be described in further detail by referring to a preferred embodiment depicted in the accompanying drawings. In these drawing.

Figure 1:
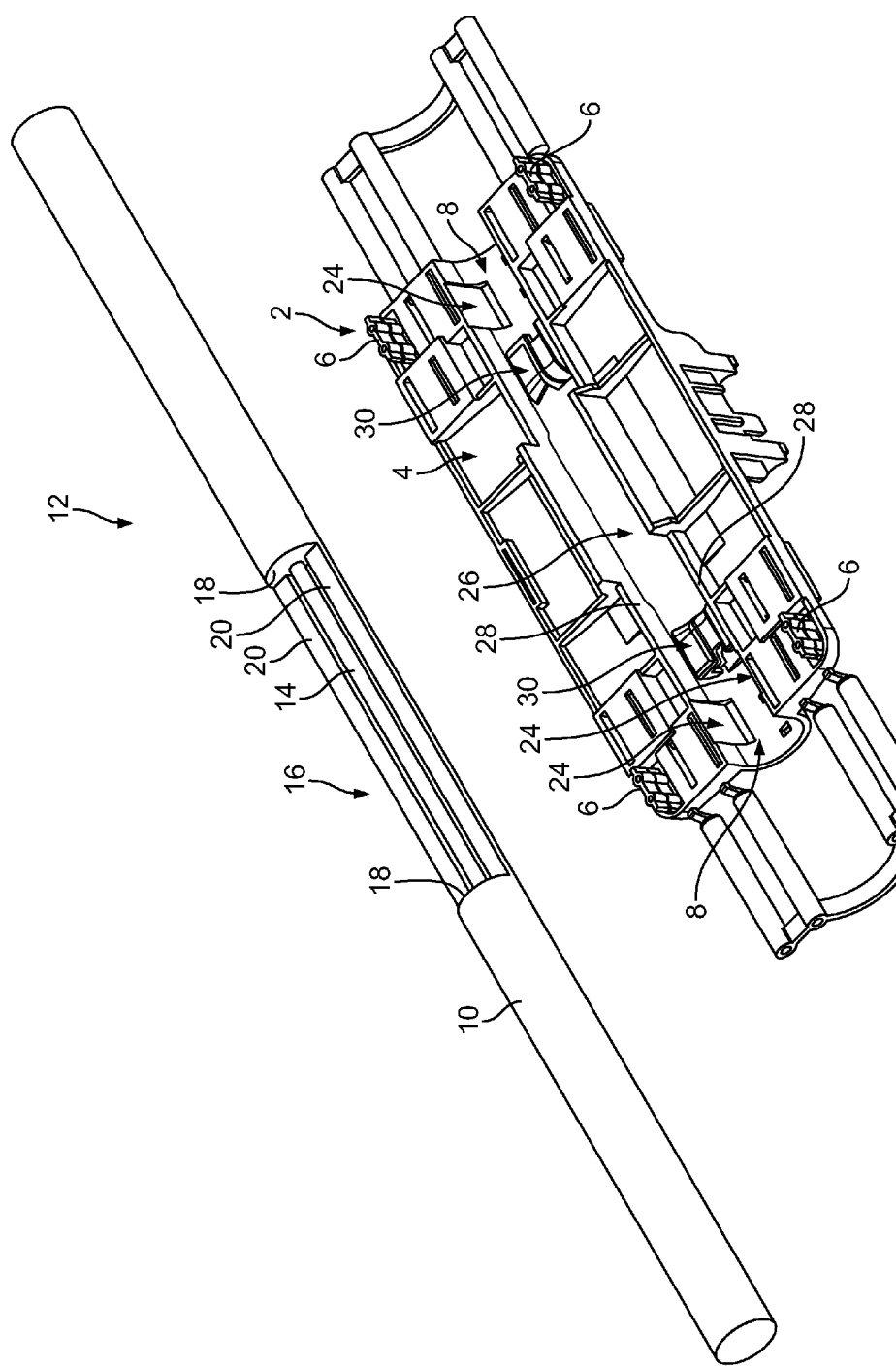
FIG. 1 shows a perspective rear side view of the embodiment together with a cable to be received in said embodiment.

In the figures, reference numeral 2 identifies an insert which is adapted to be inserted into a housing (not shown). The optical cable assembly which can be obtained by using the insert according to the invention will be described at the end of this specific description.

The insert 2 has a flat insert base 4, the lower side thereof (compare FIG. 1) being projected by posts 6 for supporting the insert 2 against the base of a housing element. In the middle of the forward and rearward end of the insert base 4 there are provided optical cable guide means 8 adapted to receive the jacket 10 of an optical cable identified with reference numerals 12 surrounding the lower optical fiber elements 14.

As evident from FIG. 1, the optical cable 12 is provided with a cut-out portion 16 which has been provided by partially removing the jacket 10 of the optical cable 12. In the shown embodiment said cut-out portion 16 is provided between two essentially semi-circular side surfaces 18 and two parallel surfaces 20 which extend parallel to the running direction of the optical fiber elements 14. The uncut, i.e. normal length of the optical cable 12 has a circular cross sectional shape. The optical cable guide means 8 each comprise a semicircular shell 22 adopted to receive and partially surround the jacket 10 of the optical cable 12 adjacent to the cut-out portion 16. Each of said semicircular shells 22, comprises two lateral openings 24 adapted to receive cable fixation means like T-wraps or hose clamps.

Between the optical cable guide means 8 there is provided a rectangular recess 26 recessed within the insert base 4. On the long side of this recess 26 there are provided longitudinal rims 28 projecting the lower side of the inset base 4 and providing lateral guidance for the optical cable 12 in the cut-out portion 16. In the present embodiment, the longitudinal rims 28 have a distance essentially corresponding the diameter and thus the maximum thickness of the optical cable 12 in the cut-out portion 16.

Between the optical guidance means 8, i.e. the semicircular shell 22 and the end of the recess 26 in longitudinal direction there are provided cross links 30 which extend transverse to the running direction of the optical cable 12 and bridges the space provided between the longitudinal rims 28.

Figure 2:
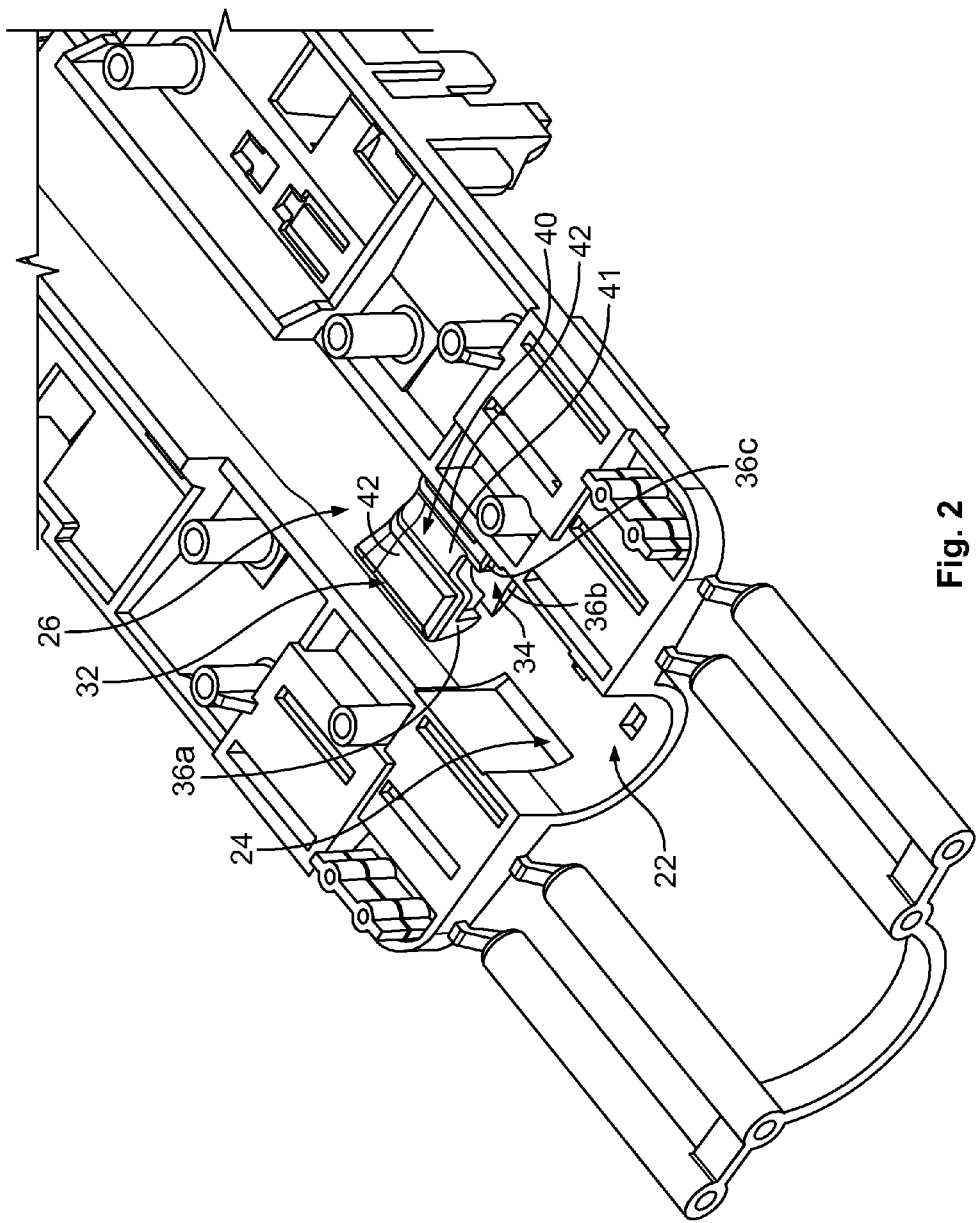
FIG. 2 shows an enlarged view of a section of the embodiment shown in FIG. 2.

The lower side of the each cross link 30 provides first abutment section 32, which is considered to form the first form fit means which are adapted to cooperate with the two parallel surfaces 20 thereby preventing tilting of the optical cable 12 relative to said insert 2 (cp. FIG. 2). Abutment of those first form fit means 32 against the lower side of the cross link 30 is assisted by the cable fixation introduced through the lateral openings 24 and forcing the optical cable 12 towards the upper side of the insert.

Between said abutment section 32 and the inner cylindrical surface of the semicircular shell 22 there is provided a second form fit means 34, provided by wall sections 36a, b, c each of them lying in a single plane, for axially positioning the cut-out portion 16 within the insert 2. In accordance with the shape of the side surfaces 18, which strictly extend in radial direction of the optical fibre 12, wall sections 36a, b, c, project in a right angle from the abutment section 32 and the cylindrical surface of the semicircular shell 22, respectively. The form fit means 34 can likewise be provided by a unitary wall instead of wall section 36 a, b, c. In the present case, the surface 36 is divided into segments as the plane providing this surface is projected by a movable insert of the injection molding mold for making the embodiment.

When providing the cut-out portion 16, the distance between the opposing side surfaces 18 is to be selected such, that this distance essentially corresponds to the distance of the two second form fit means 34.

Figure 3:
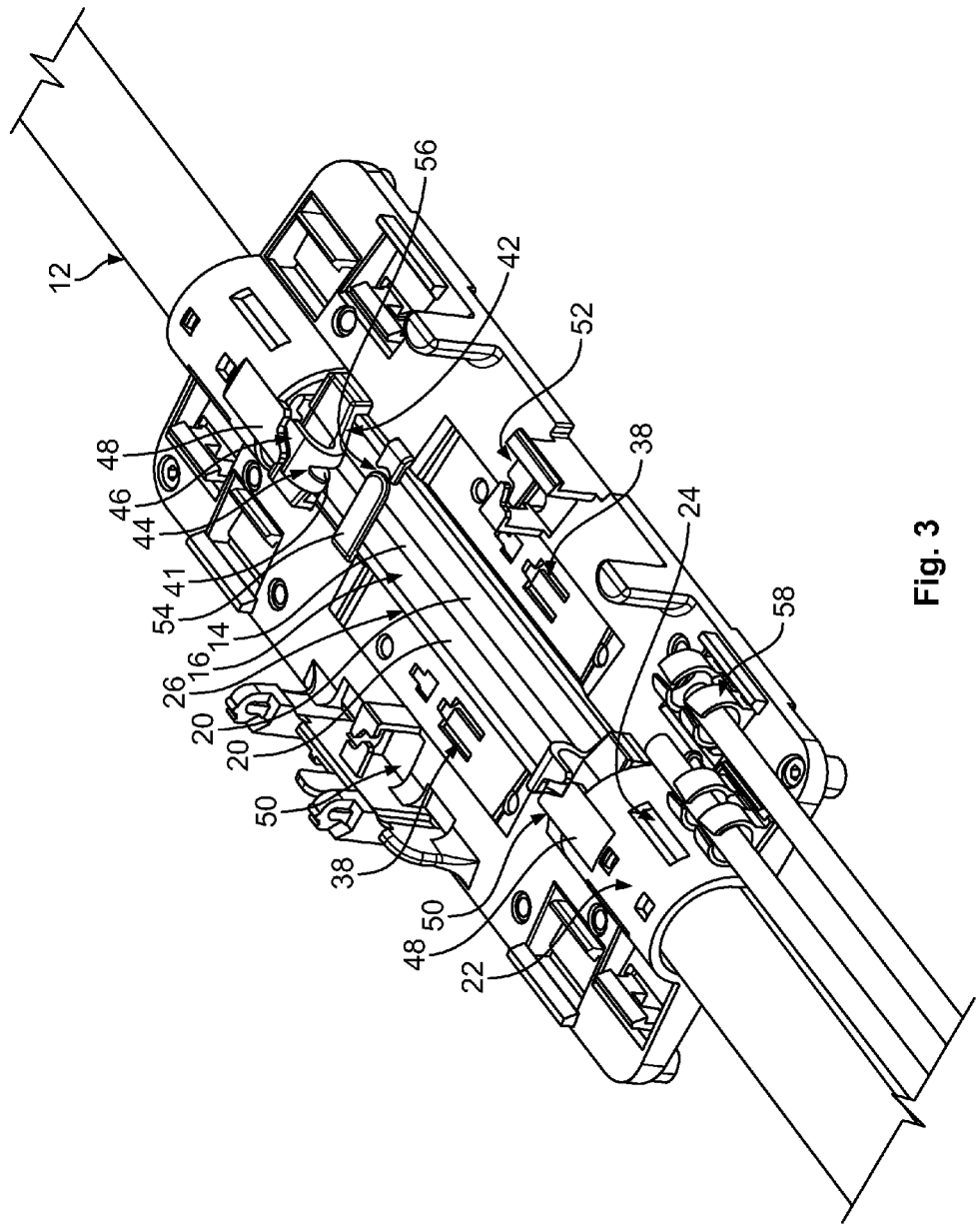
FIG. 3 shows a perspective top view of the embodiment.

After inserting the cut-out portion 16 within the insert 2 such, that this cut-out portion 16 is available through the recess 26, a selected optical fibre element 14 can be pulled out from the optical cable 12 in a reliable manner in which the cable 12 and all remaining optical fibre elements 16 provided in the optical cable 12 is held in place (cp. FIG. 3).

Such pulling operation may e.g. be necessary to splice a selected or plural selected optical fibre elements 14 and connect the same to another optical fibre cable coming e.g. from the user side. In the course of such splicing, a splice will be fixed to both ends of the selected optical fibre elements thereby connecting the same to allow optical signals to be transmitted between both fibre elements. On a general basis, the splice i.e. the splice member, also serves to hold the selected cable in place, which may be arranged in a loop on the insert 2. For holding the splice member, there are provided splice holding means 38 recessed in the insert base 4.

The specific design of the embodiment which facilitates pulling out of selected optical fibre elements 14 from the optical cable 12 are described: reference is made to FIG. 2 showing details of the first and second form fit means 32, 34. The bottom side of crosslink 30 is in fact divided by a central groove 40 extending in the running direction of the optical cable 12 and forming two identical abutment faces 42 each being provided between said groove 40 and the longitudinal rim 28. Adjacent to the second form fit means 34, the groove 40 has a concave surface 41 which is shaped parallel to the longitudinal extension of the optical cable 12. Towards the recess 26, the concave shape 41 in longitudinal direction of the groove 40 is bent upwardly thereby merging into a convex bent element 44 which projects the upper side of the insert base 6 in a constantly smoothly curved manner to a bent of approximately 180° and also, projects from the recess 26 in longitudinal direction of the optical cable 12 (compare FIG. 3). The bent element 44 protrudes in the running direction of the optical fiber elements 14, i.e. it extends parallel to the longitudinal direction of the recess 26.

Adjacent to the groove 40, and in longitudinal extension of the running direction of the optical cable 12, both abutment faces 42 are likewise curved in a convex manner thereby providing a smoothly curved rim merging to the recess 26.

The entire contour between the abutment faces 42 and a distal end 46 of the bend element 44 is smoothly curved. The distal end 46 of the bend element 44 extends essentially parallel to the plane of the insert base 4 and parallel to a loop holding member 48 which is connected to the outer circumferential surface of the semicircular shell 22 and in alignment with the distal end 46.

Those loop holding members 48 form part of a loop receiving arrangement 50 provided on the upper side of the insert base 4 and comprising lateral loop holding members 52 positioned in the middle of the insert base 4 in longitudinal direction and at the lateral rim thereof.

FIG. 3 also shows a bar 54 extending across the recess 26 and being provided with a slot 56. This bar 54 has a lower surface adjacent to the parallel surfaces 20 of the cut-out portion 16 and in parallel with those parallel surfaces 20. Thus, the bar 54 may assist positioning of the cut-out portion 16 in a rotational free manner. The ultimate purpose of bar 54 is to hold all optical fibre elements 14 within a remaining groove formed by the jacket 10.

For splicing an individual optical fibre element selected from the optical fibre elements 14, the respective optical fibre element is selected and passed through slot 56. Then, an appropriate length of the selected optical fibre element is prepared by pulling this optical fibre element out of the optical cable 12. In the course of this pulling operation, the selected optical fibre element will be guided by the bend element 44. In case of a pulling action essentially parallel to the running direction of the optical fibre elements 14, the selected optical fibre element will be guided within groove 40. In case of pulling the selected optical fibre element essentially perpendicular to the plane receiving insert base 4, i.e. in the plane of the running direction of the optical fibre elements 14 but essentially perpendicular thereto, there is sufficient smooth guiding of the selected optical fibre element. This guiding prevents the optical fibre element from sliding along sharp edges and from being damaged upon the pulling out performance. In case the selected optical fibre element is by error is pulled out in a direction angular to the running direction of the remaining optical fibre elements 14, the entirely smooth surface of the lower side of the crosslink 30 and the transition of said crosslink 30 towards the recess 26 prevents damage of the optical fibre.

After complete pulling out of the selected fibre element, the same is cut and spliced. The excessive length of the selected fibre element and possibly any excessive length of a optical fibre cable coming from a user and being connected to the selected optical fibre element is received in the loop holding arrangement 50. Thus, the loop will run between the bend element 44 and the semicircular shell 22. Storing of the loop will not contribute to the height of the insert 2. Additionally, in case of need of splicing a further optical fibre element and selecting the same by pulling this optical fibre element out from the optical cable 12, pulling action of this further selected optical fibre element will not interfere with any loop of other optical fibre elements already stored in the insert.

For a complete description, in particular of the embodiment as depicted in FIG. 3, it should be mentioned that there are provided cable jacket termination units 58 formed as separate elements adapted to receive and hold the terminal end of a jacket of an optical fibre cable from a user. Those jacket termination units 58 are received in openings recessed in the insert base 4 and held therein by snapping mechanisms. The insert 2 prepared in the above-mentioned way will be incorporated into a housing which provides ports for all optical cables being fed into the housing. This housing is adapted to hermetically seal those optical cables to avoid entry of water and/or humidity into the housing.

The invention claimed is:

1. An insert for guiding a part of an optical cable comprising at least one optical fiber element and accommodated in a housing of an optical fiber assembly, said part of the optical cable has a cut-out portion exposing said at least one optical fiber element, wherein said insert comprises:
    an optical cable guidance means for guiding said optical cable across the insert;
    a recess surrounding the exposed optical fiber element, and adapted to receive the cut-out portion; and
    a convex bend element arranged at an end portion of the recess and projecting from the recess in a curved manner in a longitudinal direction of the optical cable and towards the recess and thereafter reversely bending to project away from the recess.

2. The insert according to claim 1, wherein said bent element protrudes the recess in a running direction of the optical fiber element.

3. The insert according to claim 1, wherein the insert further comprises a crosslink bridging the cut-out portion of the optical cable, wherein said bend element is fixed to said crosslink.

4. The insert according to claim 1, wherein said bend element has a groove for guiding the optical fiber element in a pull back action.

5. The insert according to claim 4, wherein said crosslink has an abutment section on its lower side designed to abut against the cut-out portion of the optical cable, wherein said abutment section is divided by the groove into two abutment faces.

6. The insert according to claim 1, wherein said insert further comprises loop receiving arrangement for holding a loop formed by the pulled-out optical fiber element, wherein said bend element and said crosslink form part of said loop receiving arrangement.

7. The insert according to claim 1, wherein said guidance means is adapted to receive said jacket of the optical cable in a form fit manner.

8. The insert according to claim 7, wherein said crosslink is arranged adjacent to said guidance means.

9. The insert according to claim 1, wherein said insert further comprises a hold-down device for holding remaining optical fiber elements in the cut-out portion, wherein said hold-down device has a slot for separating an optical fiber element from the cut-out portion.

10. An optical fiber assembly for an optical cable comprising:
    a housing with a housing lower body and a housing upper body enclosing an insert according to any of the preceding claims, and
    a sealing means for sealing the housing.

* * * * *